United States Patent
Von Der Haar

(10) Patent No.: US 6,667,482 B2
(45) Date of Patent: Dec. 23, 2003

(54) RADIATION DETECTOR FOR A COMPUTED TOMOGRAPHY

(75) Inventor: Thomas Von Der Haar, Nuremberg (DE)

(73) Assignee: Siemens Aktiengesellschaft, Münich (DE)

( * ) Notice: Subject to any disclaimer, the term of this patent is extended or adjusted under 35 U.S.C. 154(b) by 75 days.

(21) Appl. No.: 10/108,594

(22) Filed: Mar. 28, 2002

(65) Prior Publication Data

US 2002/0148968 A1 Oct. 17, 2002

(30) Foreign Application Priority Data

Mar. 30, 2001 (DE) .......................... 101 16 222

(51) Int. Cl.⁷ ............................... G01T 1/164
(52) U.S. Cl. ................. 250/370.11; 250/363.1
(58) Field of Search ............ 250/370.11, 363.11, 250/363.01, 363.04, 363.02, 366, 367, 368, 369, 370.01, 370.09, 385.1

(56) References Cited

U.S. PATENT DOCUMENTS

| | | | | |
|---|---|---|---|---|
| 5,323,006 A | * | 6/1994 | Thompson et al. | 250/363.02 |
| 5,991,357 A | * | 11/1999 | Marcovici et al. | 378/19 |
| 6,087,663 A | * | 7/2000 | Moisan et al. | 250/367 |
| 6,194,726 B1 | * | 2/2001 | Pi et al. | 250/363.1 |
| 6,420,711 B2 | * | 7/2002 | Tumer | 250/370.09 |
| 2003/0128801 A1 | * | 7/2003 | Eisenberg et al. | 378/19 |

FOREIGN PATENT DOCUMENTS

DE     OS 195 02 574     8/1995

* cited by examiner

Primary Examiner—Constantine Hannaher
Assistant Examiner—Otilia Gabor
(74) Attorney, Agent, or Firm—Schiff Hardin & Waite

(57) ABSTRACT

A radiation detector for an X-ray computed tomography apparatus, has a number of detector modules mounted side-by-side, each detector module having a sensor array composed of a number of sensor elements. For simplifying the maintenance of the detector, each detector module contains an electronic memory arrangement for storing data relating to the calibration of each of the sensor elements.

11 Claims, 1 Drawing Sheet

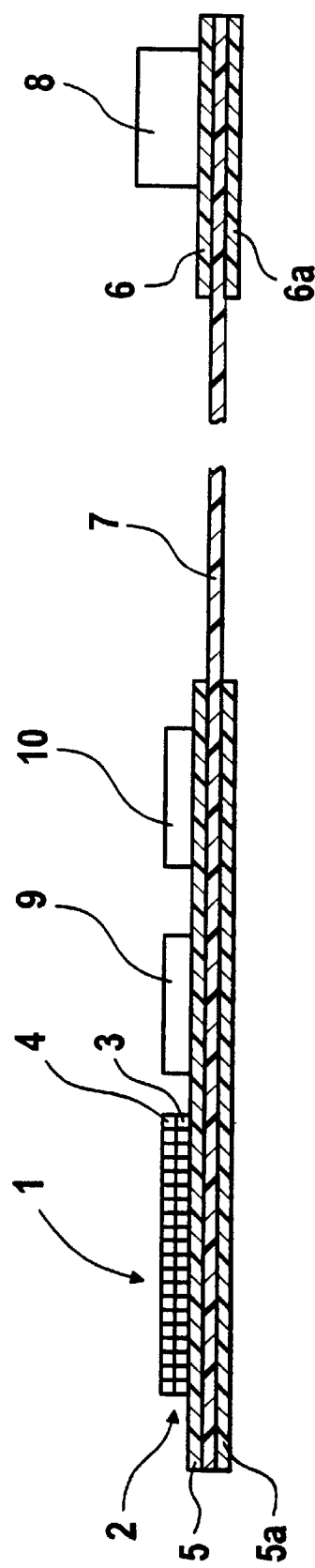

RADIATION DETECTOR FOR A COMPUTED TOMOGRAPHY

BACKGROUND OF THE INVENTION

1. Field of the Invention

The present invention is directed to a radiation detector for an X-ray computed tomography apparatus, of the type having a number of detector modules mounted side-by-side, each module having a sensor array composed of a number of sensor elements.

2. Description of the Prior Art

A detector of the above type is disclosed, for example, in German OS 195 02 574. The known detector has a number of parallel detector lines that proceed in the direction of the axis of a subject, for example a patient, to be transirradiated. Each detector line can be implemented as an assembly unit or detector module. A sensor array formed of a number of sensor elements is thereby accepted on a printed circuit board. The printed circuit board is connected via a flexible section to a further printed circuit board on which a plug for connection to a following evaluation electronics is mounted.

The sensor elements respectively exhibit slightly different properties. In order to avoid image artifacts, it is necessary to calibrate each sensor element. To that end, calibration tables are produced with special measuring devices. The calibration tables contain, for example, information about the temperature behavior, the radiation drift behavior, the relative signal strength, the persistence behavior, the location dependency of the signal strength, the spectral behavior, and malfunctioning sensor elements.

When a detector module fails, the calibration tables must be produced anew overall after the replacement thereof with a further detector module. Due to the considerable time outlay connected therewith and the necessity of special measuring devices, a malfunctioning detector is, according to conventional procedures, not replaced on site. The entire detector is replaced by a new detector and the calibration table is determined for the new detector by processing in the evaluation electronics.

SUMMARY OF THE INVENTION

An object of the present invention is to eliminate these disadvantages according to the prior art. In particular, it is an object to provide a detector for an x-ray computed tomography apparatus that is as simple as possible to maintain.

This object is achieved in accordance with the invention, in a detector of the type described above wherein each detector module contains an electronic storage arrangement for storing data for the calibration of each one of the sensor elements. At a replacement of such a detector module, it is no longer required to produce the calibration tables anew. The maintenance of a malfunctioning detector is thus reduced to the simple replacement of a detector module. This saves time and cost.

The electronic storage arrangement can be an ASIC (application-specific integrated circuit). Such a component is available at a relatively low cost.

In an embodiment of the invention, each detector module has a temperature sensor. This makes it possible to calibrate the detector module dependent on the current temperature. The measured results that are supplied are especially precise.

Further, a circuit for digitizing the signals supplied by the sensor array can be provided. This can be another ASIC. In this case, serial signals can be communicated directly from the detector module to the following evaluation electronics. The evaluation electronics can be correspondingly simplified.

The temperature sensor, if used, is formed as preferably a p-n semiconductor junction, and can be a component of the ASIC serving for storage or of the further ASIC. Such a temperature sensor thus can be manufactured in an especially economic way.

The sensor array can be a photo-diode array by a number of photo-diodes. Each sensor element is expediently formed of a photo-diode provided with a scintillator element at the radiation entry side. The storage arrangement is preferably mounted on a printed circuit board that accepts the photo-diode array. The printed circuit board can be connected via a flexible section to a further printed circuit board that accepts a plug. The above features contribute to a compact structure and a simple replaceability of the detector module.

The invention also is directed to an x-ray computed tomography apparatus having an inventive detector module is claimed.

DESCRIPTION OF THE DRAWINGS

The single FIGURE, is a side view partly in section, of an exemplary embodiment of the invention.

DESCRIPTION OF THE PREFERRED EMBODIMENTS

A detector module of an x-ray computed tomography apparatus is shown in a schematic cross-sectional view. A sensor array referenced 1 overall is composed of a photo-diode array 2 that is formed of a number of photo-diodes 3. A scintillator element 4 is mounted on each photo-diode 3 at the radiation entry side. Together with the scintillator element 4, the photo-diode 3 forms a sensor element. The sensor array formed of a number of sensor elements is mounted on a first printed circuit board 5. The first printed circuit board 5 is connected to a further printed circuit board 6 via a flexible section 7. Interconnects are conducted in the flexible section 7 (not shown). A plug 8 for connection of the detector module to an evaluation electronics (not shown here) is provided on the further printed circuit board 6. A number of printed circuit boards 5a, 6a can also cover the flexible section 7 in the fashion of a sandwich structure for reinforcing the detector module.

A first ASIC 9 and a second ASIC 10 are mounted on the printed circuit board 5. The first ASIC 9 serves the purpose of digitizing the signals supplied by the sensor array 1. An electronic memory is provided in the second ASIC 10. The data for calibration of each of the sensor elements are stored in this memory. These data particularly include the following information: temperature behavior, radiation drift behavior, relative signal strength, persistence behavior, location dependency of the signal strength, spectral behavior, and information about malfunctioning sensor elements.

The digital signals supplied by the first ASIC 9 can be calibrated by means of the calibration data deposited in the second ASIC 10 and can be forwarded as serial signals to the following evaluation electronics via the plug 8.

It has proven especially advantageous to integrate a temperature sensor in the form of a p-n semiconductor junction in the second ASIC 10. The calibration can thus ensue dependent on the temperature prevailing at the detector module. Especially exact measured results are supplied. The image resolution can thus be enhanced.

The above self-calibrating detector module is simple and constructed in a compact way. An x-ray computer tomograph having a detector comprising the disclosed detector modules can be maintained fast and simply.

Although modifications and changes may be suggested by those skilled in the art, it is in the intention of the inventor to embody within the patent warranted hereon all changes and modifications as reasonably and properly come within the scope of his contribution to the art.

I claim as my invention:

1. A radiation detector for an X-ray computed tomography apparatus, comprising:

a plurality of radiation detection modules mounted side-by-side;

each radiation detector module comprising a sensor array formed by a plurality of radiation sensor elements, each of said sensor elements requiring calibration; and each of said detector modules containing an electronic memory arrangement in which data for calibrating each of the sensor elements of that module are stored.

2. A radiation detector as claimed in claim 1 wherein said electronic memory arrangement is an application-specific integrated circuit.

3. A radiation detector as claimed in claim 1 wherein each detector module further comprises a temperature sensor.

4. A radiation detector as claimed in claim 1 wherein the respective sensor elements of said sensor array emit analog signals, and wherein each of said radiation detector modules comprises a digitization circuit, to which said analog signals are supplied, for digitizing said analog signals.

5. A radiation detector as claimed in claim 4 wherein said digitization circuit is an application-specific integrated circuit.

6. A radiation detector as claimed in claim 1 wherein said application-specific integrated circuit is a first application-specific integrated circuit, and wherein said radiation detector further comprises a temperature sensor, and wherein said sensor elements in said sensor array respectively emit analog signals, and wherein each of said detector modules further comprises a second application-specific integrate circuit to which said analog signals are supplied, for digitizing said analog signals, and wherein said temperature sensor is a component of one of said first application-specific integrated circuit or said second application-specific integrated circuit.

7. A radiation detector as claimed in claim 6 wherein said temperature sensor is formed as a PN-junction.

8. A radiation detector as claimed in claim 1 wherein said sensor array is a photodiode array composed of a plurality of photodiodes as said plurality of sensor elements.

9. A radiation detector as claimed in claim 1 wherein each of said sensor elements has a radiation entry side, and wherein each of said sensor elements comprises a photodiode preceded by a scintillator element disposed at said radiation entry side.

10. A radiation detector as claimed in claim 1 wherein said sensor array comprises a photodiode array formed by a plurality of photodiodes as said plurality of sensor elements, and wherein each of said detector modules comprises a printed circuit board on which said photodiode array is mounted, and wherein said memory arrangement is also mounted on said printed circuit board.

11. A radiation detector as claimed in claim 10 wherein said printed circuit board is a first printed circuit board, and further comprising a second printed circuit board that accepts a plug, and a flexible section connecting said first printed circuit board and said second printed circuit board.

* * * * *